(No Model.) 2 Sheets—Sheet 1.

A. J. TYLER.
ECCENTROLINEAD.

No. 388,799. Patented Aug. 28, 1888.

WITNESSES:
Jno. S. Finch Jr.
C. D. Davis

INVENTOR.
Aaron J. Tyler.
BY
C. M. Alexander
ATTORNEY, (No Model.) 2 Sheets—Sheet 2.

A. J. TYLER.
ECCENTROLINEAD.

No. 388,799. Patented Aug. 28, 1888.

WITNESSES.
Jno. S. Finch Jr.
C. M. Davis

INVENTOR.
Aaron J. Tyler.
By C. M. Alexander
Attorney.

UNITED STATES PATENT OFFICE.

AARON J. TYLER, OF ALBION, NEW YORK.

ECCENTROLINEAD.

SPECIFICATION forming part of Letters Patent No. 388,799, dated August 28, 1888.

Application filed May 14, 1888. Serial No. 273,890. (No model.)

*To all whom it may concern:*

Be it known that I, AARON J. TYLER, a citizen of the United States, residing at Albion, in the county of Orleans and State of New York, have invented certain new and useful Improvements in a Drafting-Instrument, of which the following is a specification, reference being had therein to the accompanying drawings, in which—

Figure 1:
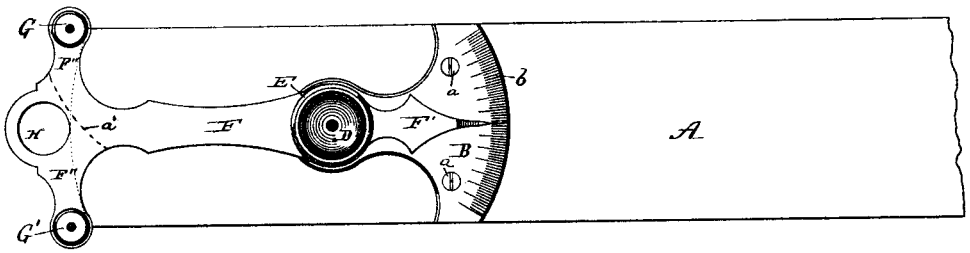
Figure 2:
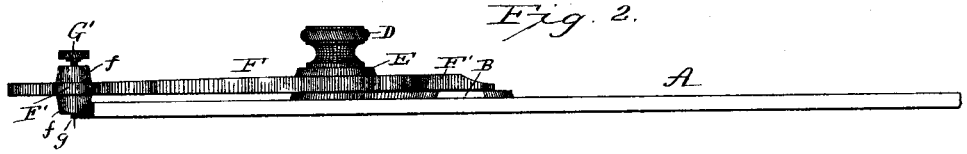
Figure 3:
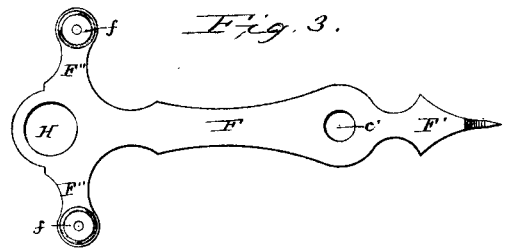
Figure 4:
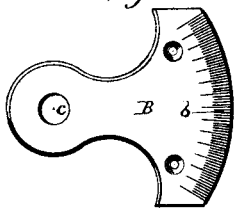
Figure 5:
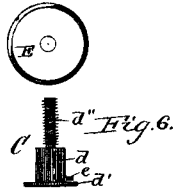
Figure 6:
Figure 7:
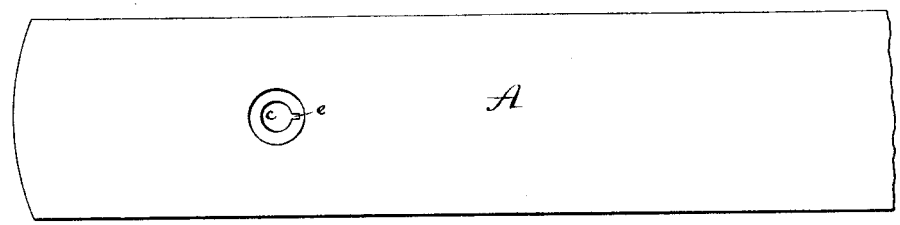
Figure 8:
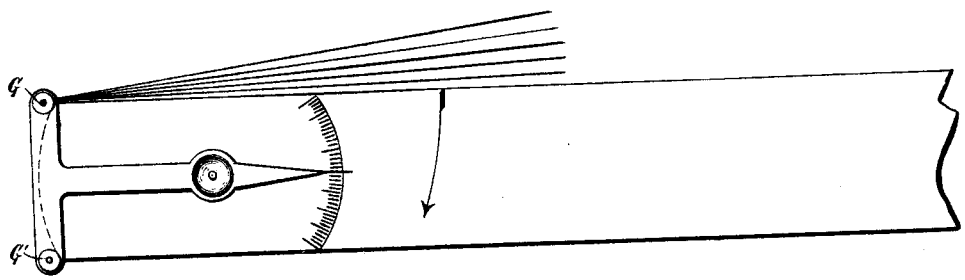
Figure 9:
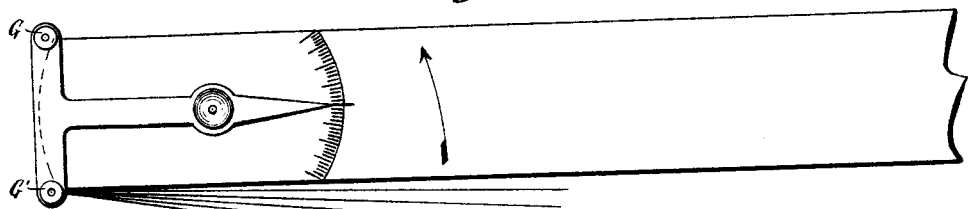

Figure 1 is a plan view of the instrument complete; Fig. 2, a side elevation of the same; Fig. 3, a plan view of the pivot plate and pointer; Fig. 4, a similar view of the indicator-plate; Fig. 5, a plan view of the washer inserted between the thumb-nut and pivot-plate; Fig. 6, a side elevation of the screw employed to bind the parts together; Fig. 7, a bottom view of the rule or straight-edge; and Figs. 8, 9, 10, and 11, diagrammatical views illustrating the various methods of using the instrument.

The invention has relation to certain new and useful improvements in drawing-instruments, and it is particularly designed as an improvement on that instrument known to mechanical draftsmen as "eccentrolinead," which consists, as heretofore constructed, essentially, of an ordinary rule or straight-edge having adjustably and pivotally attached to one of its ends an arm, the rear free end of this arm projecting out a short distance beyond the rear end of the rule and provided with an adjustable centering-needle adapted to enter the drawing-paper and serve as a pivot-pin around which the rule may be moved, the device being employed to draw or project straight lines directly from a common center or tangential to a common center, as may be desired.

The nature of my improvements will be fully understood from the following description, when taken in connection with the accompanying drawings, in which—

The letter A designates a rule or straight-edge having its rear or inner end slightly curved. Attached to the upper side of this rule, near its rear or inner end, preferably by means of screws $a\,a$, is an indicator-plate, B, this plate having marked off on its upper face a graduated arc, $b$, the middle of which is in line with the center line of the rule. Formed through the rule and indicator-plate directly in line with the middle of the graduated arc is an aperture, $c$, up through which is passed a pivotal screw, C, consisting, preferably, of a cylindrical portion, $d$, a flat head, $d'$, and a screw-threaded stem, $d''$, the head $d'$ being countersunk in the under side of the rule, and the cylindrical portion $d$ being provided with a radial pin or projection, $e$, which enters a recess, $e'$, in the rule and prevents the screw from turning.

Upon the upper screw-threaded stem of the screw C is applied a thumb-nut, D, which bears, through the medium of a washer, E, upon the upper side of a plate or arm, F, this plate being also provided with an aperture, $c'$, for the passage of the cylindrical portion $d$ of the said screw C. By thus securing the plate F it is evident that it may be adjusted to any position around the pivotal screw and held in such position by means of the thumb-nut. The forward end of this plate F is provided with a pointer or finger, F', which moves around the graduated arc $b$ as the said plate is adjusted around its pivotal screw C, and thereby serves to indicate to the draftsman the exact angle of the line he is projecting. The rear end of the plate F is provided with two lateral arms, F'' F'', which have formed on or near their ends internally screw-threaded bosses or enlargements $f\,f$. Tapped into these bosses are screws G G', the lower ends of which are formed into suitable needle-points, $g$, these points being adapted, respectively, to enter the drawing-paper and serve as pivots around which the rule is moved. When the device is not in use, the needle-points may be drawn up into the bosses $f$ to protect them from injury.

When the pointer F' is set exactly in the center of the graduated arc, the needle-points will be in a direct line with the respective edges of the rule, as clearly shown in Fig. 1. While one of the needle-points is in use, the other is drawn up in its boss out of the way, as is obvious.

The letter H designates a hole, which may or may not be formed in the inner end of plate F for the purpose of hanging the instrument up on a nail or peg.

Should it be desired to project lines which radiate from a common center, the pointer is adjusted to the middle of the graduated arc, as shown in Fig. 1, and the thumb-nut D tightened. When the rule is to be moved around in the direction indicated by the arrow in Fig. 8, (and the upper edge of the rule is to be used,) the needle-point of screw G is projected and used as the pivot, and when the rule is to be moved around the center in the opposite direction and its lower edge is to be employed the needle-point of the screw G' is projected, the needle-point not in use in either case being drawn up out of the way. Thus it will be observed that in drawing radiating lines with my improved instrument the rule may be moved in either direction around a center and either one of its edges employed without in the least disturbing the adjustment of the parts, all that is required being to remove the instrument from the paper and withdraw one needle-point and project the other and then replace it, being careful to use precisely the same center both times.

Figure 10:
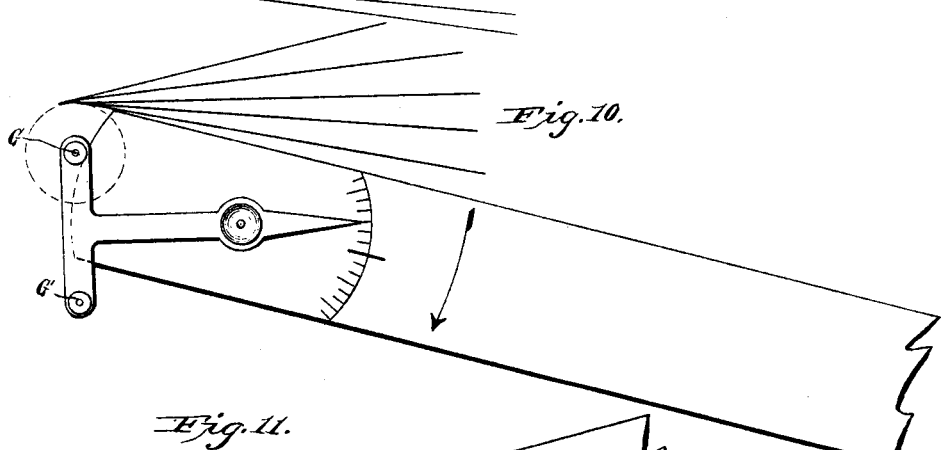
Figure 11:
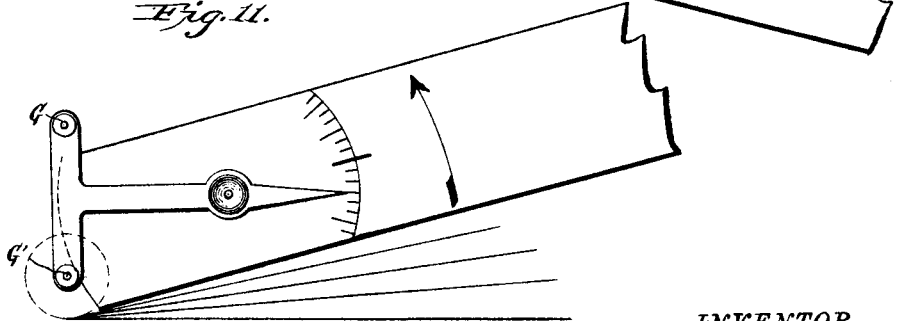

In drawing tangential lines the pointer is moved and adjusted to either one side or the other of the middle of the graduated arc, as the case may require, as clearly shown in Figs. 10 and 11.

In these instruments as heretofore constructed the plate or arm F has been made straight and the single needle-point with which it is provided inserted in its extreme inner end. This construction has been found defective, inasmuch as when the device is adjusted for drawing radial lines the arm will project or extend over the inner portion of the edge of the rule that is in use, and thereby prevent the drawing-pen from being brought close up to the needle-point. It is also defective in drawing radial lines, in that the adjustment of the plate or arm F has to be changed when it is desired to move the rule around its center in the opposite direction from that for which it is first adjusted, as is evident, and as it is not provided with any means for accurately adjusting it—such as a pointer and graduated arc—it will be obvious that the two adjustments will not be exactly alike. My improvement is designed to and does effectually overcome these and other difficulties with the eccentrolinead now in use.

It is evident that I may use but one arm, F''', as shown in dotted lines a' in Fig. 1, without departing from my invention in the least. The two lateral arms are, however, preferred.

When the rule is constructed of metal or other hard material, the graduated arc b may be engraved upon its upper face, instead of on a separate indicator-plate, as is shown in the drawings.

Having thus fully described my invention, what I claim as new, and desire to secure by Letters Patent, is—

1. The combination of a rule, a plate, F, pivoted thereto near its inner end, the rear end of the said plate being provided with lateral arms and the arms being provided with adjustable needle-points, substantially as described.

2. The combination of a rule, a plate, F, pivoted thereto near its inner end, provided with lateral arms, these arms being provided with internally screw-threaded bosses f, and screws G G', working in these bosses, these screws being provided with needle-points, substantially as described.

3. The combination of a rule provided with a graduated arc, b, a plate, F, pivoted to this rule near its inner end, this plate F being provided with a pointer, F', and an adjustable needle-point carried by the plate F, substantially as described.

4. The combination of a rule, a plate provided with two lateral arms, F''', and a pointer, F', the said arms being pivoted to the rule, adjustable needle-points carried by the said lateral arms, an indicator-plate provided with a graduated arc, around which the said pointer F' moves, and a pivotal screw and thumb-nut for holding the parts in any adjusted position, substantially as described.

In testimony whereof I affix my signature in presence of two witnesses.

AARON J. TYLER.

Witnesses:
CHAS. D. DAVIS,
CHAS. D. JOST.